(12) United States Patent
Nakagawa et al.

(10) Patent No.: US 11,981,183 B2
(45) Date of Patent: May 14, 2024

(54) AIR CONDITIONING DEVICE FOR VEHICLE

(71) Applicant: MITSUBISHI HEAVY INDUSTRIES THERMAL SYSTEMS, LTD., Tokyo (JP)

(72) Inventors: Nobuya Nakagawa, Tokyo (JP); Yasuo Katayama, Tokyo (JP); Soichiro Fujita, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 17/253,260

(22) PCT Filed: May 24, 2019

(86) PCT No.: PCT/JP2019/020737
§ 371 (c)(1),
(2) Date: Dec. 17, 2020

(87) PCT Pub. No.: WO2020/021838
PCT Pub. Date: Jan. 30, 2020

(65) Prior Publication Data
US 2021/0252943 A1 Aug. 19, 2021

(30) Foreign Application Priority Data

Jul. 25, 2018 (JP) ................................ 2018-139604

(51) Int. Cl.
*B60H 1/00* (2006.01)
*B60H 1/32* (2006.01)
(52) U.S. Cl.
CPC ..... *B60H 1/00921* (2013.01); *B60H 1/32284* (2019.05)

(58) Field of Classification Search
CPC .................... B60H 1/00921; B60H 1/3228
See application file for complete search history.

(56) References Cited

U.S. PATENT DOCUMENTS 5,704,219 A * 1/1998 Suzuki ............... B60H 1/00907
62/197
9,784,486 B2 10/2017 Miyakoshi et al.
(Continued)

FOREIGN PATENT DOCUMENTS

JP        9-86149 A      3/1997
JP     2000-52754 A      2/2000
(Continued)

OTHER PUBLICATIONS

Baelz North America, 2-Way vs 3-Way Valves, 2018 (Year: 2018).*
(Continued)

*Primary Examiner* — Henry T Crenshaw
(74) *Attorney, Agent, or Firm* — Birch, Stewart, Kolasch & Birch, LLP

(57) ABSTRACT

This air conditioning device for a vehicle has: an indoor condenser; an indoor evaporator; a first expansion valve; a second expansion valve; a refrigerant line; an expansion valve control detector; and a controller. The expansion valve control detector is constituted by: only one temperature sensor that detects the temperature of refrigerant in an inter-expansion valve line of the refrigerant line; and only one pressure sensor that detects the pressure of the refrigerant in the inter-expansion valve line. During a cooling operation, the controller issues, to the first expansion valve, an opening command corresponding to a state quantity of the refrigerant that has been detected by the expansion valve control detector, and during a heating operation, the controller issues, to the second expansion valve, an opening command corresponding to a state quantity of the refrigerant
(Continued)

that has been detected by the expansion valve control detector.

8 Claims, 4 Drawing Sheets

(56) References Cited

U.S. PATENT DOCUMENTS

| | | | | |
|---|---|---|---|---|
| 9,937,771 | B2* | 4/2018 | Suzuki | B60H 1/04 |
| 2011/0005255 | A1* | 1/2011 | Tanihata | B60H 1/00785 |
| | | | | 165/59 |
| 2011/0016896 | A1* | 1/2011 | Oomura | F25B 30/02 |
| | | | | 392/347 |
| 2012/0241139 | A1* | 9/2012 | Katoh | B60H 1/00921 |
| | | | | 165/104.19 |
| 2012/0255319 | A1* | 10/2012 | Itoh | F25B 41/20 |
| | | | | 62/226 |
| 2013/0139528 | A1* | 6/2013 | Katayama | B60H 1/00921 |
| | | | | 62/81 |
| 2013/0312442 | A1* | 11/2013 | Suzuki | F25B 47/006 |
| | | | | 62/160 |
| 2014/0083122 | A1* | 3/2014 | Ha | F25B 40/06 |
| | | | | 62/159 |
| 2014/0298838 | A1* | 10/2014 | Morishita | B60H 1/321 |
| | | | | 62/151 |
| 2014/0338382 | A1* | 11/2014 | Miyakoshi | F25B 40/00 |
| | | | | 62/159 |
| 2014/0352341 | A1* | 12/2014 | Hamamoto | B60H 1/321 |
| | | | | 62/278 |
| 2014/0373562 | A1* | 12/2014 | Suzuki | B60H 1/00064 |
| | | | | 62/159 |
| 2015/0040594 | A1* | 2/2015 | Suzuki | B60H 1/3207 |
| | | | | 62/159 |
| 2015/0253045 | A1* | 9/2015 | Yamada | F25B 30/02 |
| | | | | 62/324.1 |
| 2015/0308462 | A1* | 10/2015 | Awa | F04F 5/46 |
| | | | | 62/515 |
| 2016/0052365 | A1* | 2/2016 | Kohigashi | B60H 1/22 |
| | | | | 62/278 |
| 2016/0075212 | A1* | 3/2016 | Morishita | B60H 1/00899 |
| | | | | 165/41 |
| 2016/0082810 | A1* | 3/2016 | Suzuki | B60H 1/00921 |
| | | | | 62/325 |
| 2016/0257179 | A1* | 9/2016 | Miyakoshi | B60H 1/00921 |
| 2016/0280041 | A1* | 9/2016 | Suzuki | B60H 1/00921 |
| 2016/0288618 | A1* | 10/2016 | Katoh | B60H 1/00921 |
| 2017/0151856 | A1* | 6/2017 | Kuwahara | B60H 1/3207 |
| 2017/0151857 | A1* | 6/2017 | Suzuki | F25B 6/04 |
| 2018/0259218 | A1* | 9/2018 | Song | F24F 13/24 |
| 2019/0111756 | A1* | 4/2019 | Makimoto | B60H 1/32281 |
| 2019/0275861 | A1* | 9/2019 | Kyuto | |
| 2020/0139788 | A1* | 5/2020 | Dong | B60H 1/3213 |

FOREIGN PATENT DOCUMENTS

| | | |
|---|---|---|
| WO | WO 2014/199916 A1 | 12/2014 |
| WO | WO 2017/217099 A1 | 12/2017 |
| WO | WO 2018/096869 A1 | 5/2018 |

OTHER PUBLICATIONS

International Search Report for International Application No. PCT/JP2019/020737, dated Jul. 9, 2019, with an English translation.
Written Opinion of the International Searching Authority for International Application No. PCT/JP2019/020737, dated Jul. 9, 2019, with an English translation.

* cited by examiner

AIR CONDITIONING DEVICE FOR VEHICLE

TECHNICAL FIELD

The present invention relates to an air conditioning device for a vehicle, which is mounted on the vehicle.

This application claims the right of priority based on Japanese Patent Application No. 2018-139604 filed with the Japan Patent Office on Jul. 25, 2018, the content of which is incorporated herein by reference.

BACKGROUND ART

As an air conditioning device for a vehicle, for example, there is a device disclosed in PTL 1 below.

The air conditioning device for a vehicle includes a compressor, an indoor condenser, an indoor evaporator, an outdoor heat exchanger, a first expansion valve as first decompression means, a second expansion valve as second decompression means, a three-way electromagnetic valve as switching means, and a two-way electromagnetic valve.

The first expansion valve reduces the pressure of a refrigerant in a cooling mode to expand the refrigerant. The second expansion valve reduces the pressure of the refrigerant in a heating mode to expand the refrigerant. Each of the first expansion valve and the second expansion valve has a valve case, a ball (valve body) disposed in the valve case, a temperature detector that detects the temperature of the refrigerant, and a pressure detector that detects a differential pressure of the refrigerant. Both the temperature detector and the pressure detector are provided in the valve case. The ball (valve body) operates according to the temperature detected by the temperature detector and the differential pressure detected by the pressure detector.

In the air conditioning device for a vehicle, since the valve body of each expansion valve operates according to the differential pressure or the temperature of the refrigerant, it is possible to enhance cooling and heating capacity or cooling and heating efficiency.

CITATION LIST

Patent Literature

[PTL 1] PCT International Publication No.

SUMMARY OF INVENTION

Technical Problem

In the technique described in PTL 1 above, the temperature detector and the pressure detector are provided in each of the first expansion valve and the second expansion valve, and therefore, each expansion valve increases in size, whereby the size of the air conditioning device for a vehicle increases, and in addition, there is a problem in that the number of detectors increases and the manufacturing cost also increases.

Therefore, the present invention has an object to provide an air conditioning device for a vehicle, in which it is possible to suppress an increase in size of the device and an increase in manufacturing cost while enhancing cooling and heating capacity or cooling and heating efficiency.

Solution to Problem

In order to solve the above problem, according to an aspect of the present invention, there is provided an air conditioning device for a vehicle including: a compressor that compresses a refrigerant; an indoor condenser that performs heat exchange between the refrigerant and indoor air to cool and condense the refrigerant and heat the indoor air; an indoor evaporator that performs heat exchange between the refrigerant and the indoor air to heat and evaporate the refrigerant and cool the indoor air; an outdoor heat exchanger that performs heat exchange between the refrigerant and outside air to function as a condenser that cools and condenses the refrigerant during cooling and function as an evaporator that heats and evaporates the refrigerant during heating; a first expansion valve that expands the refrigerant in a liquid phase and sends the refrigerant to the indoor evaporator, during cooling; a second expansion valve that expands the refrigerant in a liquid phase and sends the refrigerant to the outdoor heat exchanger, which functions as an evaporator during heating, during heating; a refrigerant line that interconnects the compressor, the indoor condenser, the indoor evaporator, the outdoor heat exchanger, the first expansion valve, and the second expansion valve; an expansion valve control detector that detects a state quantity of the refrigerant; and a controller. The refrigerant line has an inter-expansion valve line which connects the first expansion valve and the second expansion valve, and in which the refrigerant in a liquid phase is present during heating and cooling, and an inter-expansion valve connection line which is connected to the inter-expansion valve line without intervention of equipment including a valve, and in which the refrigerant in a liquid phase is present during heating and cooling. The expansion valve control detector includes only one temperature sensor provided in the inter-expansion valve line or the inter-expansion valve connection line to detect a temperature of the refrigerant in the inter-expansion valve line or the inter-expansion valve connection line, and only one pressure sensor provided in the inter-expansion valve line or the inter-expansion valve connection line to detect a pressure of the refrigerant in the inter-expansion valve line or the inter-expansion valve connection line. The controller gives, during cooling, an opening degree command indicating an opening degree according to the state quantity of the refrigerant detected by the expansion valve control detector to the first expansion valve, and gives, during heating, an opening degree command indicating an opening degree according to the state quantity of the refrigerant detected by the expansion valve control detector to the second expansion valve.

The first expansion valve in this aspect expands the liquid-phase refrigerant and sends the refrigerant to the indoor evaporator, during cooling. Further, the controller in this aspect gives the opening degree command indicating an opening degree according to the state quantity of the refrigerant detected by the expansion valve control detector to the first expansion valve. As a result, the opening degree of the first expansion valve in this aspect becomes an opening degree according to the state quantity of the refrigerant detected by the expansion valve control detector. Therefore, in this aspect, the cooling capacity or the cooling efficiency can be enhanced.

The second expansion valve in this aspect expands the liquid-phase refrigerant and sends the refrigerant to the outdoor heat exchanger functioning as an evaporator, during heating. Further, the controller in this aspect gives the opening degree command indicating an opening degree according to the state quantity of the refrigerant detected by the expansion valve control detector to the second expansion valve. As a result, the opening degree of the second expansion valve in this aspect becomes an opening degree according to the state quantity of the refrigerant detected by the expansion valve control detector. Therefore, in this aspect, the heating capacity or the heating efficiency can be enhanced.

The expansion valve control detector in this aspect is provided in the inter-expansion valve line or the inter-expansion valve connection line to detect the state quantity of the refrigerant in the inter-expansion valve line or the inter-expansion valve connection line. The liquid-phase refrigerant is present in the inter-expansion valve line or the inter-expansion valve connection line during both heating and cooling. Therefore, the opening degree of the first expansion valve during cooling and the opening degree of the second expansion valve during heating can be controlled based on the state quantity of the refrigerant detected by the expansion valve control detector composed of a set of detectors. Therefore, in this aspect, an increase in the number of detectors can be suppressed, and an increase in the size of the air conditioning device for a vehicle and an increase in manufacturing cost can be suppressed.

Here, the air conditioning device for a vehicle according to the above aspect may further include: a three-way valve that has an inlet through which the refrigerant flows in, and a first outlet and a second outlet through which the refrigerant flows out, and can change to a cooling state where the inlet and the first outlet communicate with each other, and a heating state where the inlet and the second outlet communicate with each other; and a two-way valve. In this case, the outdoor heat exchanger has a first port and a second port through which the refrigerant enters and exits. Each of the first expansion valve and the second expansion valve has a first port and a second port through which the refrigerant enters and exits. The refrigerant line has a discharge line connecting a discharge port of the compressor and the inlet of the three-way valve, a heat exchanger first port line connecting the first outlet of the three-way valve and the first port of the outdoor heat exchanger, a heat exchanger second port line connecting the second port of the outdoor heat exchanger and the first port of the second expansion valve, the inter-expansion valve line connecting the second port of the second expansion valve and the first port of the first expansion valve, a suction line connecting the second port of the first expansion valve and a suction port of the compressor, a first heating dedicated line connecting the second outlet of the three-way valve and the inter-expansion valve line, and a second heating dedicated line connecting the first port of the outdoor heat exchanger and the suction line. The first heating dedicated line constitutes at least a part of the inter-expansion valve connection line. The indoor condenser is provided in the discharge line or the first heating dedicated line. The indoor evaporator is provided in the suction line. The two-way valve is provided in the second heating dedicated line. When the three-way valve is in the cooling state, the controller gives a closing command to the two-way valve, gives an open command to the second expansion valve, and gives an opening degree command indicating an opening degree according to the state quantity of the refrigerant detected by the expansion valve control detector to the first expansion valve. Further, when the three-way valve is in the heating state, the controller gives an open command to the two-way valve, gives a closing command to the first expansion valve, and gives an opening degree command indicating an opening degree according to the state quantity of the refrigerant detected by the expansion valve control detector to the second expansion valve.

Here, in the air conditioning device for a vehicle according to the above aspect, which includes the first heating dedicated line, the expansion valve control detector may be provided between the second port of the second expansion valve and a connection position with the first heating dedicated line in the inter-expansion valve line, and detect the state quantity of the refrigerant between the second port of the second expansion valve and the connection position with the first heating dedicated line in the inter-expansion valve line.

The liquid-phase refrigerant flows between the second port of the second expansion valve and the connection position with the first heating dedicated line in the inter-expansion valve line during both cooling and heating. Therefore, in this aspect, the state quantity of the liquid-phase refrigerant can be accurately detected during both cooling and heating.

In the air conditioning device for a vehicle according to any one of the above aspects, the controller may give an opening degree command indicating an opening degree according to a subcooling degree, which is a deviation between a saturation temperature of the refrigerant, which is determined by a pressure detected by the pressure sensor, and a temperature of the refrigerant detected by the temperature sensor, to the first expansion valve and the second expansion valve.

In this case, the controller may give an opening degree command in a direction of making an opening degree larger than that at the present time, in a case where the subcooling degree is larger than a threshold value regarding the subcooling degree, and give an opening degree command in a direction of making an opening degree smaller than that at the present time, in a case where the subcooling degree is smaller than the threshold value.

In this case, the threshold value may be in a range of 5° C. to 20° C.

In the air conditioning device for a vehicle according to any one of the above aspects, in which the controller uses the threshold value regarding the subcooling degree, the controller may change the threshold value according to a rotation speed of the compressor.

In this case, the controller may use a first threshold value as the threshold value when the rotation speed of the compressor is a first rotation speed, and use a second threshold value larger than the first threshold value as the threshold value when the rotation speed of the compressor is a second rotation speed higher than the first rotation speed.

Advantageous Effects of Invention

According to an aspect of the present invention, it is possible to suppress an increase in the size of the device and an increase in manufacturing cost while enhancing the cooling and heating capacity or the cooling and heating efficiency.

DESCRIPTION OF EMBODIMENTS

Hereinafter, an embodiment and various modification examples of the air conditioning device for a vehicle according to the present invention will be described with reference to the drawings.

Embodiment

An embodiment of the air conditioning device for a vehicle according to the present invention will be described with reference to FIGS. 1 to 3.

The air conditioning device for a vehicle of the present embodiment is mounted on an EV vehicle (Electric Vehicle), an HEV vehicle (Hybrid Electric Vehicle), a PHEV vehicle (Plug-in Hybrid Electric Vehicle), or the like.

Figure 1:
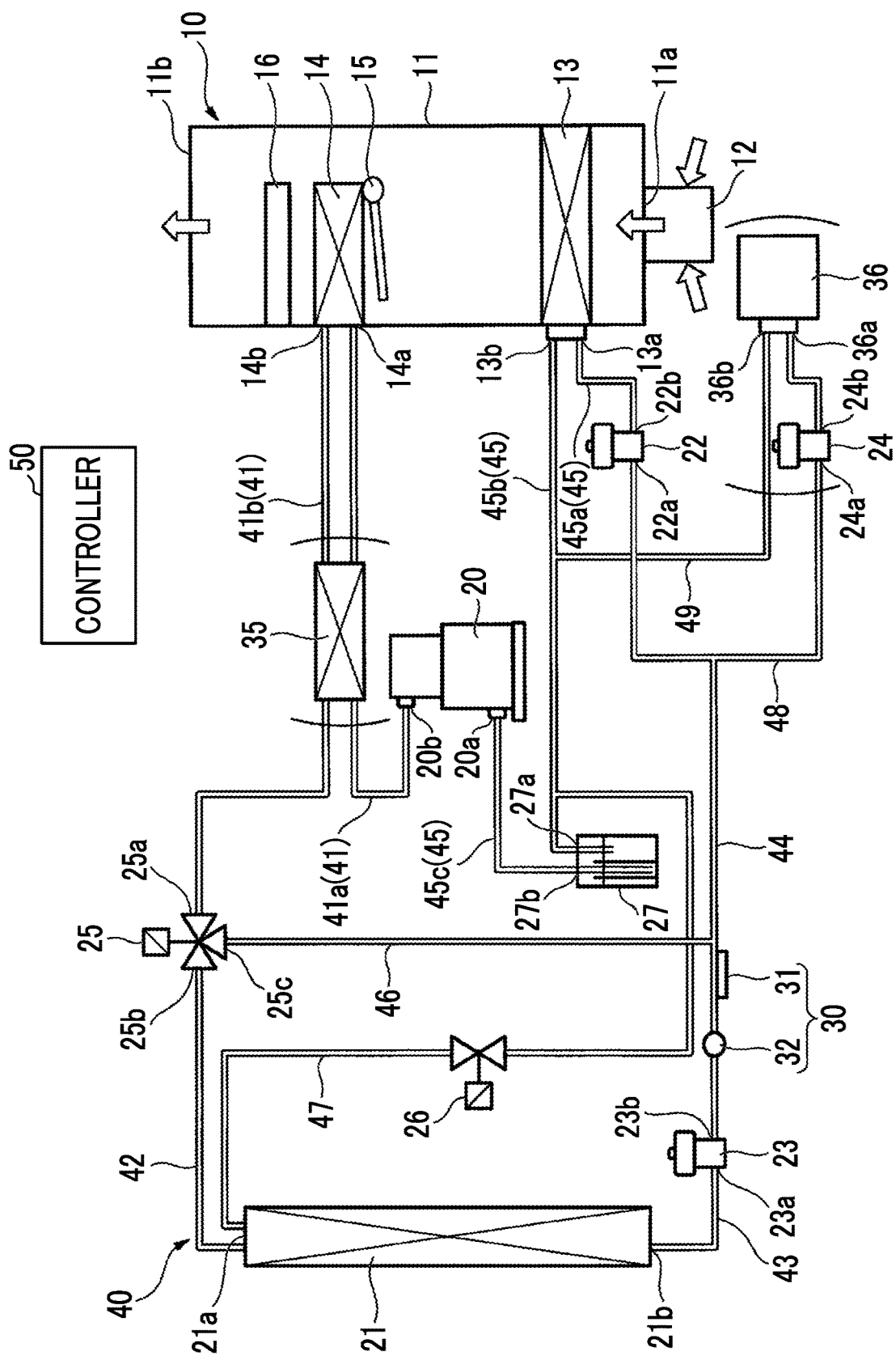
FIG. 1 is a system diagram of an air conditioning device for a vehicle according to an embodiment of the present invention.

As shown in FIG. 1, the air conditioning device for a vehicle includes an HVAC (Heating Ventilation and Air Conditioning) unit 10, a compressor 20, an outdoor heat exchanger 21, a first expansion valve 22, a second expansion valve 23, a three-way valve 25, a two-way valve 26, a buffer tank 27, a refrigerant line 40 connecting these components to each other, an expansion valve control detector 30, and a controller 50.

The HVAC unit 10 includes a unit duct 11, a blower 12, an indoor evaporator 13, an indoor condenser 14, an air mix damper 15, and an auxiliary heater 16.

The unit duct 11 is disposed in an instrument panel of a vehicle. The unit duct 11 has an air inlet 11a and an air outlet 11b. The blower 12 selectively sucks one of outside air and indoor air and sends the air as indoor air from the air inlet 11a of the unit duct 11 into the unit duct 11. The indoor evaporator 13 is disposed in the unit duct 11. The indoor evaporator 13 has an inlet 13a through which a refrigerant flows in, and an outlet 13b through which the refrigerant flows out. The indoor evaporator 13 performs the heat exchange between the indoor air from the blower 12 and the refrigerant to heat and evaporate the refrigerant while cooling the indoor air. The indoor condenser 14 is disposed at a position closer to the air outlet 11b than the indoor evaporator 13 in the unit duct 11. The indoor condenser 14 has an inlet 14a through which the refrigerant flows in, and an outlet 14b through which the refrigerant flows out. The indoor condenser 14 performs the heat exchange between the indoor air from the blower 12 and the refrigerant to cool and condense the refrigerant while heating the indoor air. The air mix damper 15 is disposed along the indoor condenser 14 between the indoor evaporator 13 and the indoor condenser 14 in the unit duct 11. The air mix damper 15 adjusts the amount of air that passes through the indoor condenser 14, of air that has flowed into the unit duct 11, and the amount of air that bypasses the indoor condenser 14 without passing through it, of the air that has flowed into the unit duct 11, according to an instruction from the controller 50. The auxiliary heater 16 is disposed closer to the air outlet 11b side than the indoor condenser 14 is, in the unit duct 11. In a case where even if air is heated by the indoor condenser 14, the temperature of the air does not rise to a target temperature, the auxiliary heater 16 heats the air according to an instruction from the controller 50. The air outlet 11b of the unit duct 11 is connected to a vent provided in the instrument panel or the like.

The compressor 20 has a suction port 20a for sucking in the refrigerant, and a discharge port 20b for discharging the refrigerant. The compressor 20 compresses the refrigerant sucked in through the suction port 20a and discharges it through the discharge port 20b. The compressor 20 can change a rotation speed, which is a driving amount, according to an instruction from the controller 50.

The outdoor heat exchanger 21 has a first port 21a and a second port 21b through which the refrigerant enters and exits. The outdoor heat exchanger 21 performs the heat exchange between the refrigerant and the outside air.

Each of the first expansion valve 22 and the second expansion valve 23 is an electromagnetic valve. Each of these expansion valves has a valve case, a valve body disposed in the valve case, and an electromagnetic drive mechanism for moving the valve body in the valve case to change a valve opening degree. The valve case has first ports 22a and 23a and second ports 22b and 23b through which the refrigerant enters and exits.

Each of the three-way valve 25 and the two-way valve 26 is an electromagnetic valve. The three-way valve 25 has a valve case, a valve body disposed in the valve case, and an electromagnetic drive mechanism for moving the valve body in the valve case. The valve case has an inlet 25a through which the refrigerant flows in, and a first outlet 25b and a second outlet 25c through which the refrigerant flows out. The valve body can be displaced to a cooling state where the inlet 25a and the first outlet 25b communicate with each other and a heating state where the inlet 25a and the second outlet 25c communicate with each other. The electromagnetic drive mechanism displaces the valve body to the heating state or the cooling state according to an instruction from the controller 50.

The buffer tank 27 is a tank for temporarily storing the refrigerant.

The expansion valve control detector 30 is provided in the refrigerant line 40 and detects the state quantity of the refrigerant in the refrigerant line 40. The expansion valve control detector 30 is composed of only one set of detectors having one temperature sensor 31 for detecting the temperature of the refrigerant and one pressure sensor 32 for detecting the pressure of the refrigerant. Both the temperature sensor 31 and the pressure sensor 32 are provided in the refrigerant line 40.

The refrigerant line 40 includes a discharge line 41, a heat exchanger first port line 42, a heat exchanger second port line 43, an inter-expansion valve line 44, a suction line 45, a first heating dedicated line 46, and a second heating dedicated line 47.

The discharge line 41 connects the discharge port 20b of the compressor 20 and the inlet 25a of the three-way valve 25. The discharge line 41 has a first discharge line 41a and a second discharge line 41b. The first discharge line 41a connects the discharge port 20b of the compressor 20 and the inlet 14a of the indoor condenser 14. The second discharge line 41b connects the outlet 14b of the indoor condenser 14 and the inlet 25a of the three-way valve 25. Accordingly, the indoor condenser 14 is provided in the discharge line 41.

The heat exchanger first port line 42 connects the first outlet 25b of the three-way valve 25 and the first port 21a of the outdoor heat exchanger 21. The heat exchanger second port line 43 connects the second port 21b of the outdoor heat exchanger 21 and the first port 23a of the second expansion valve 23. The inter-expansion valve line 44 connects the second port 23b of the second expansion valve 23 and the first port 22a of the first expansion valve 22.

The suction line 45 connects the second port 22b of the first expansion valve 22 and the suction port 20a of the compressor 20. The suction line 45 has a first suction line 45a, a second suction line 45b, and a third suction line 45c. The first suction line 45a connects the second port 22b of the first expansion valve 22 and the inlet 13a of the indoor evaporator 13. The second suction line 45b connects the outlet 13b of the indoor evaporator 13 and an inlet 27a of the buffer tank 27. The third suction line 45c connects an outlet 27b of the buffer tank 27 and the suction port 20a of the compressor 20. Accordingly, the indoor evaporator 13 and the buffer tank 27 are provided in the suction line 45.

The first heating dedicated line 46 connects the second outlet 25c of the three-way valve 25 and the inter-expansion valve line 44. The second heating dedicated line 47 connects the first port 21a of the outdoor heat exchanger 21 and the second suction line 45b. The first heating dedicated line 46 is directly connected to the inter-expansion valve line 44 without the intervention of equipment including a valve, and configures an inter-expansion valve connection line in which a liquid-phase refrigerant is present during both heating and cooling.

The two-way valve 26 is provided in the second heating dedicated line 47. The expansion valve control detector 30 is provided between the second port 23b of the second expansion valve 23 and the connection position with the first heating dedicated line 46 in the inter-expansion valve line 44 and detects the state quantity of the refrigerant between them.

The controller 50 receives a mode from a vehicle occupant or the like and controls the compressor 20, the three-way valve 25, the two-way valve 26, the first expansion valve 22, the second expansion valve 23, the blower 12, the air mix damper 15, and the auxiliary heater 16 according to the received mode. Here, as the mode that the controller 50 receives, there are a heating mode and a cooling mode.

Next, the operation of the air conditioning device for a vehicle described above will be described.

First, the operation of the air conditioning device for a vehicle in a case where the controller 50 has received the heating mode from the vehicle occupant or the like will be described.

When the controller 50 receives the heating mode from the vehicle occupant or the like, the controller 50 gives a command to the three-way valve 25 to enter the heating state, and gives an open command to the two-way valve 26. The controller 50 gives a closing command to the first expansion valve 22, and gives an opening degree command indicating an opening degree according to the state quantity of the refrigerant detected by the expansion valve control detector 30 to the second expansion valve 23. The controller 50 gives a drive command to the blower 12 of the HVAC unit 10. The controller 50 gives a damper opening degree command of making the amount of air passing through the indoor condenser 14, of the air that has flowed into the unit duct 11, larger than the amount of air bypassing the indoor condenser 14 without passing through it, of the air that has flowed into the unit duct 11, to the air mix damper 15 of the HVAC unit 10. Further, the controller 50 also gives a drive command to the compressor 20.

Figure 2:
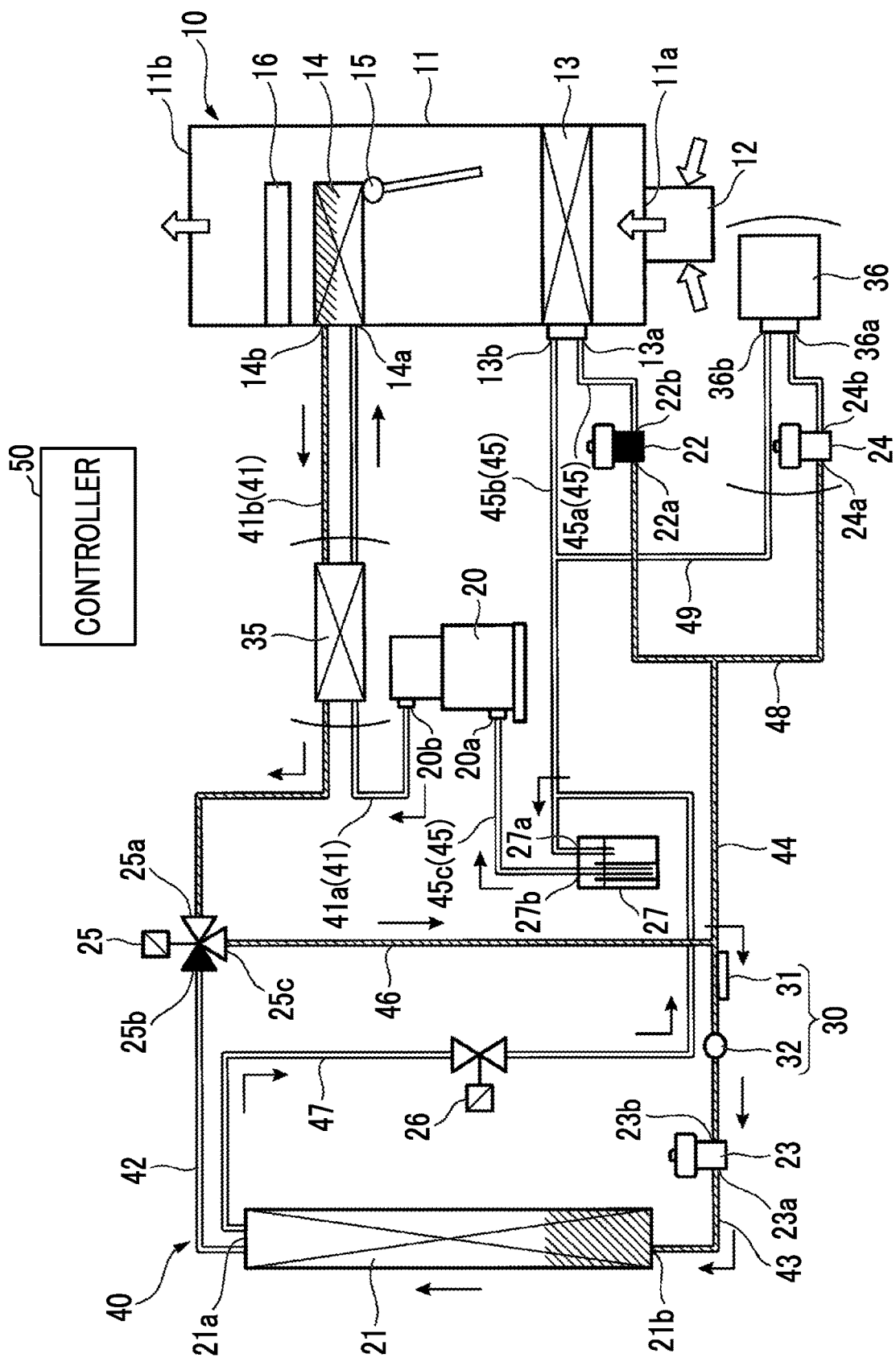
FIG. 2 is an explanatory diagram showing a flow of a refrigerant in a heating mode of the air conditioning device for a vehicle according to an embodiment of the present invention.

As a result, as shown in FIG. 2, the three-way valve 25 enters the heating state, and the inlet 25a and the second outlet 25c of the three-way valve 25 enter a communication state. The two-way valve 26 enters an open state. The first expansion valve 22 enters a closed state. The blower 12 of the HVAC unit 10 begins to drive. The opening degree of the air mix damper 15 becomes an opening degree in which the amount of air passing through the indoor condenser 14, of the air that has flowed into the unit duct 11, becomes larger than the amount of air bypassing the indoor condenser 14 without passing through it, of the air that has flowed into the unit duct 11. The compressor 20 begins to drive and rotate.

When the air conditioning device for a vehicle enters the above state, the gas-phase refrigerant compressed by the compressor 20 flows into the indoor condenser 14 via the first discharge line 41a. The air sent into the unit duct 11 by the blower 12 of the HVAC unit 10 passes through the indoor condenser 14. In the indoor condenser 14, the heat exchange between the gas-phase refrigerant and the air is performed, so that the refrigerant is cooled and condensed and the air is heated. The heated air flows into the occupant space in the vehicle from the unit duct 11 through the vent provided in the instrument panel or the like.

The refrigerant condensed in the indoor condenser 14, that is, the liquid-phase refrigerant flows into the three-way valve 25 from the inlet 25a of the three-way valve 25 via the second discharge line 41b. In FIG. 2, in the refrigerant line 40, the hatched portion is a portion where the liquid-phase refrigerant is present. In the three-way valve 25, in the heating state, the inlet 25a and the second outlet 25c are in the communication state, and therefore, the liquid-phase refrigerant flowing into the three-way valve 25 flows into the outdoor heat exchanger 21 from the second port 21b of the outdoor heat exchanger 21 via the first heating dedicated line 46, a part of the inter-expansion valve line 44, and the second expansion valve 23. The liquid-phase refrigerant is decompressed and expanded in the process of passing through the second expansion valve 23, and a part of the liquid-phase refrigerant becomes a gas phase. In the outdoor heat exchanger 21, the heat exchange between the outside air and the refrigerant is performed, so that the refrigerant is heated and evaporated and the outside air is cooled. That is, during the heating, the outdoor heat exchanger 21 functions as an evaporator.

The evaporated refrigerant, that is, the gas-phase refrigerant flows out from the first port 21a of the outdoor heat exchanger 21. The gas-phase refrigerant flows into the compressor 20 via the second heating dedicated line 47, a part of the second suction line 45b, the buffer tank 27, and the third suction line 45c.

The gas-phase refrigerant is compressed by the compressor 20 and then flows into the indoor condenser 14 via the first discharge line 41a, as described above.

The relationship between the rotation speed of the compressor 20 and a threshold value regarding a subcooling degree is stored in the controller 50. The subcooling degree is a deviation between the saturation temperature of the refrigerant and the actual temperature of the refrigerant. The relationship stored in the controller 50 is a relationship in which the threshold value increases as the rotation speed of the compressor 20 increases. The controller 50 uses this relationship to determine a threshold value according to the current rotation speed of the compressor 20. As described above, the threshold value varies according to the rotation speed of the compressor 20. However, the threshold value is in a range of 5 to 20° C., and preferably in a range of 5 to 15° C.

The pressure of the liquid-phase refrigerant detected by the pressure sensor 32 is input to the controller 50. The controller 50 obtains the saturation temperature of the refrigerant, based on this pressure. Further, the controller 50 obtains a subcooling degree which is a deviation between the saturation temperature and the temperature of the liquid-phase refrigerant detected by the temperature sensor 31. The controller 50 compares the subcooling degree with the threshold value, and in a case where the subcooling degree is larger than the threshold value, the controller 50 gives an opening degree command in a direction of making the opening degree larger than that at the present time to the second expansion valve 23. Further, in a case where the subcooling degree is smaller than the threshold value, the controller 50 gives an opening degree command in a direction of making the opening degree smaller than that at the present time to the second expansion valve 23.

The smaller the opening degree of the expansion valve, the larger the amount of decompression and the amount of expansion of the refrigerant becomes. Therefore, the smaller the opening degree of the expansion valve, the higher the cooling and heating capacity of the air conditioning device for a vehicle becomes. However, the smaller the opening degree of the expansion valve, the higher the pressure loss of the refrigerant in the refrigerant line 40 becomes, and the cooling and heating efficiency decreases. That is, the smaller the opening degree of the expansion valve, the higher the cooling and heating capacity becomes, and on the other hand, the cooling and heating efficiency decreases. On the contrary, the larger the opening degree of the expansion valve, the lower the cooling and heating capacity becomes, and on the other hand, the cooling and heating efficiency is improved.

During the intense cold in winter, there is a case where a part around the outdoor heat exchanger 21 is iced. In this case, the outdoor heat exchanger 21 cannot efficiently take in heat from the outside air, and the subcooling degree decreases, so that the heating capacity is lowered. In the present embodiment, as described above, in a case where the subcooling degree is smaller than the threshold value, the opening degree command in a direction of making the opening degree smaller than that at the present time is given to the second expansion valve 23. Therefore, in the present embodiment, for example, even in a case where a part around the outdoor heat exchanger 21 is iced, it is possible to suppress a decrease in heating capacity.

Further, even in winter, there is a case where the temperature around the outdoor heat exchanger 21 becomes high depending on a location where the vehicle is present. In this case, the outdoor heat exchanger 21 can efficiently take in heat from the outside air, and the subcooling degree increases, so that the heating capacity is improved. In the present embodiment, as described above, in a case where the subcooling degree is larger than the threshold value, the opening degree command in a direction of making the opening degree larger than that at the present time is given to the second expansion valve 23. Therefore, in the present embodiment, for example, in a case where the temperature around the outdoor heat exchanger 21 is high, it is possible to improve the heating efficiency.

In winter, there is a case where the occupant or the like gives a heating instruction to the controller 50 and then gives an instruction to further raise the temperature in the occupant space. In this case, the controller 50 increases the rotation speed of the compressor 20 in order to increase the heating capacity. As described above, the threshold value increases as the rotation speed of the compressor 20 increases. If the threshold value increases, the subcooling degree decreases relative to the threshold value. Therefore, if the rotation speed of the compressor 20 increases, the possibility that the subcooling degree may become smaller than the threshold value increases. Accordingly, in this case, in the present embodiment, the controller 50 gives the opening degree command in a direction of making the opening degree smaller than that at the present time to the second expansion valve 23 to improve the heating capacity.

In a case where the temperature in the occupant space does not rise so much even if the rotation speed of the compressor 20 is increased, or the like, the controller 50 operates the auxiliary heater 16 to further heat the air heated in the indoor condenser 14 in the auxiliary heater 16.

Next, the operation of the air conditioning device for a vehicle in a case where the controller 50 receives the cooling mode from the vehicle occupant or the like will be described.

When the controller 50 receives the cooling mode from the vehicle occupant or the like, the controller 50 gives a command to the three-way valve 25 to enter the cooling state, and gives a closing command to the two-way valve 26. The controller 50 gives an open command to the second expansion valve 23 and gives an opening degree command indicating an opening degree according to the state quantity of the refrigerant detected by the expansion valve control detector 30 to the first expansion valve 22. The controller 50 gives a drive command to the blower 12 of the HVAC unit 10. The controller 50 gives a damper opening degree command to cause most of the air which has flowed into the unit duct 11 to bypass the indoor condenser 14 without passing through it to the air mix damper 15 of the HVAC unit 10. Further, the controller 50 also gives a drive command to the compressor 20.

Figure 3:
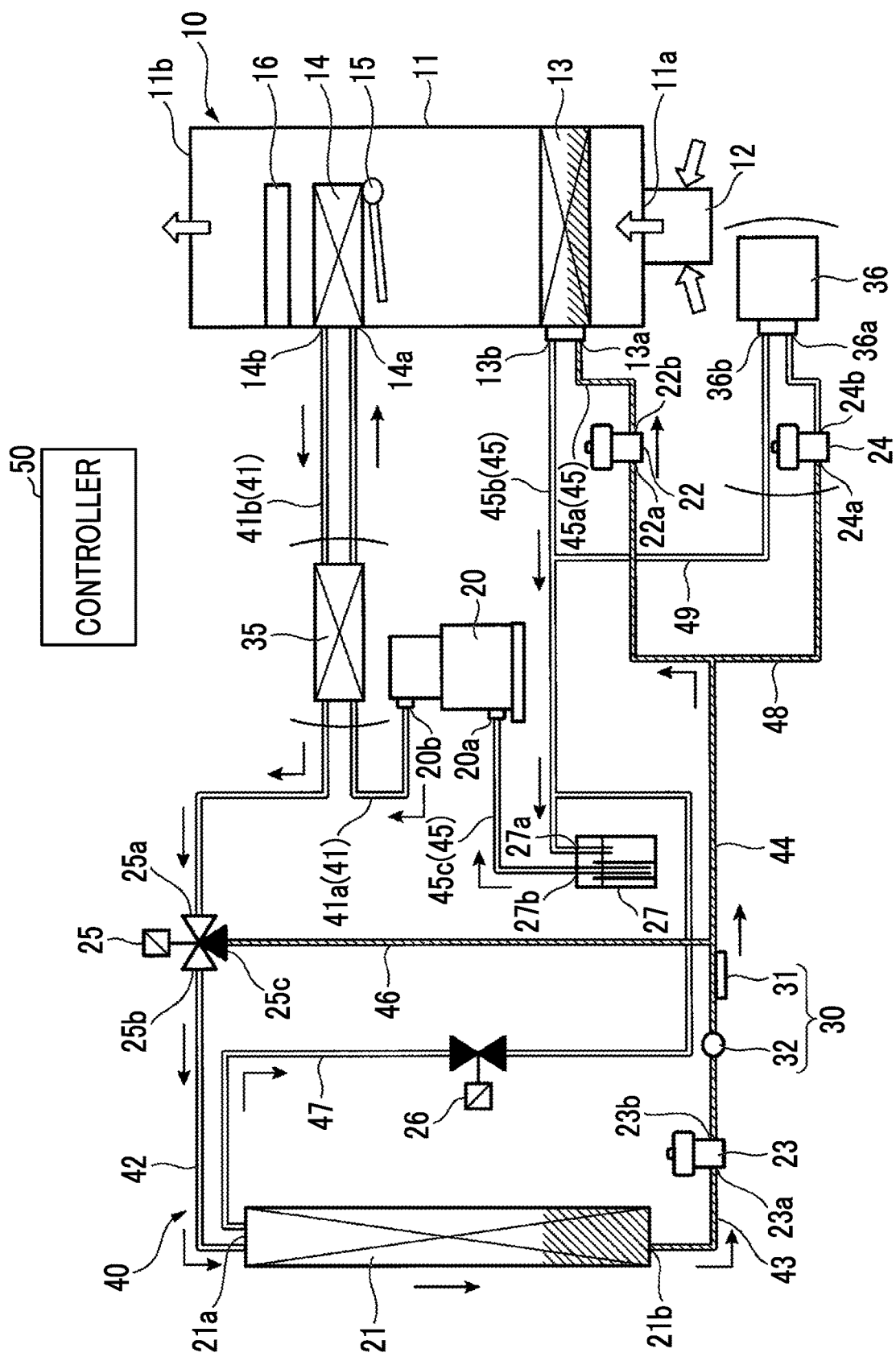
FIG. 3 is an explanatory diagram showing a flow of the refrigerant in a cooling mode of the air conditioning device for a vehicle according to an embodiment of the present invention.

As a result, as shown in FIG. 3, the three-way valve 25 enters the cooling state, and the inlet 25*a* and the first outlet 25*b* of the three-way valve 25 enter the communication state. The two-way valve 26 enters the closed state. The second expansion valve 23 enters the open state. The blower 12 of the HVAC unit 10 begins to drive. The opening degree of the air mix damper 15 becomes an opening degree in which most of the air which has flowed into the unit duct 11 bypass the indoor condenser 14 without passing through it. The compressor 20 begins to drive and rotate.

When the air conditioning device for a vehicle enters the above state, the gas-phase refrigerant compressed by the compressor 20 flows into the indoor condenser 14 via the first discharge line 41*a*. Due to the presence of the air mix damper 15 of the HVAC unit 10, the air sent into the unit duct 11 by the blower 12 does not almost pass through the indoor condenser 14. Therefore, in the indoor condenser 14, the amount of heat exchange between the gas-phase refrigerant and the air becomes small, the refrigerant is not almost condensed, and the air is not almost heated. Accordingly, the gas-phase refrigerant that has flowed into the indoor condenser 14 flows out from the indoor condenser 14 as it is.

The gas-phase refrigerant flowing out from the indoor condenser 14 flows into the three-way valve 25 from the inlet 25*a* of the three-way valve 25 via the second discharge line 41*b*. In the three-way valve 25, the inlet 25*a* and the first outlet 25*b* are in the communication state in the cooling state, and therefore, the gas-phase refrigerant which has flowed into the three-way valve 25 flows into the outdoor heat exchanger 21 from the first port 21*a* of the outdoor heat exchanger 21 via the heat exchanger first port line 42. In the outdoor heat exchanger 21, the heat exchange between the outside air and the gas-phase refrigerant is performed, so that the refrigerant is cooled and condensed and the outside air is heated. That is, during the cooling, the outdoor heat exchanger 21 functions as a condenser.

The condensed refrigerant, that is, the liquid-phase refrigerant flows out from the second port 21*b* of the outdoor heat exchanger 21. In FIG. 3, in the refrigerant line 40, the hatched portion is a portion where the liquid-phase refrigerant is present. The liquid-phase refrigerant flows into the first expansion valve 22 via the heat exchanger second port line 43, the second expansion valve 23 in the open state, and the inter-expansion valve line 44. The liquid-phase refrigerant is decompressed and expanded in the process of passing through the first expansion valve 22, and a part of the liquid-phase refrigerant becomes a gas phase. This refrigerant flows into the indoor evaporator 13 via the first suction line 45*a*.

In the indoor evaporator 13, the heat exchange between the air sent into the unit duct 11 by the blower 12 of the HVAC unit 10 and the liquid-phase refrigerant is performed, so that the refrigerant is heated and evaporated and the air is cooled. Most of the cooled air bypass the indoor condenser 14 without passing through it due to the presence of the air mix damper 15 and flow out from the unit duct 11. Then, the cooled air flows into the occupant space in the vehicle through the vent provided in the instrument panel or the like.

The refrigerant evaporated in the indoor evaporator 13, that is, the gas-phase refrigerant flows into the compressor 20 from the indoor evaporator 13 via the second suction line 45*b*, the buffer tank 27, and the third suction line 45*c*.

The gas-phase refrigerant is compressed by the compressor 20 and then flows into the indoor condenser 14 via the first discharge line 41*a*, as described above.

The pressure of the liquid-phase refrigerant detected by the pressure sensor 32 is input to the controller 50, as in the heating mode. The controller 50 obtains the saturation temperature of the refrigerant, based on this pressure. Further, the controller 50 obtains a subcooling degree which is a deviation between the saturation temperature and the temperature of the liquid-phase refrigerant detected by the temperature sensor 31. The controller 50 compares the subcooling degree with the threshold value, and in a case where the subcooling degree is larger than the threshold value, the controller 50 gives an opening degree command in a direction of making the opening degree larger than that at the present time to the first expansion valve 22. Further, in a case where the subcooling degree is smaller than the threshold value, the controller 50 gives an opening degree command in a direction of making the opening degree smaller than that at the present time to the first expansion valve 22.

During the intense heat in summer, the outdoor heat exchanger 21 cannot efficiently release the heat of the refrigerant to the outside air, and the subcooling degree becomes small, so that the cooling capacity is lowered. In the present embodiment, as described above, in a case where the subcooling degree is smaller than the threshold value, the opening degree command in a direction of making the opening degree smaller than that at the present time is given to the first expansion valve 22. Therefore, in the present embodiment, it is possible to suppress a decrease in cooling capacity during the intense heat in summer.

Further, even in summer, there is a case where the temperature around the outdoor heat exchanger 21 becomes low depending on a location where the vehicle is present. In this case, the outdoor heat exchanger 21 can efficiently release the heat of the refrigerant to the outside air, and the subcooling degree is increased, so that the cooling capacity is improved. In the present embodiment, as described above, in a case where the subcooling degree is larger than the threshold value, the opening degree command in a direction of making the opening degree larger than that at the present time is given to the first expansion valve 22. Therefore, in the present embodiment, for example, in a case where the temperature around the outdoor heat exchanger 21 is low, it is possible to improve the cooling efficiency.

In summer, there is a case where the occupant or the like gives a cooling instruction to the controller 50 and then gives an instruction to further lower the temperature in the occupant space. In this case, the controller 50 increases the rotation speed of the compressor 20 in order to increase the cooling capacity. As described above, the threshold value increases as the rotation speed of the compressor 20 increases. If the threshold value increases, the subcooling degree decreases relative to the threshold value. Therefore, if the rotation speed of the compressor 20 increases, the possibility that the subcooling degree may become smaller than the threshold value increases. Accordingly, in this case, in the present embodiment, the controller 50 gives the opening degree command in a direction of making the opening degree smaller than that at the present time to the first expansion valve 22 to improve the cooling capacity.

As described above, in the present embodiment, since the controller 50 obtains the subcooling degree of the refrigerant and controls the opening degrees of the first expansion valve 22 and the second expansion valve 23 according to the subcooling degree, it is possible to enhance the cooling and heating capacity and the cooling and heating efficiency of the air conditioning device for a vehicle.

Further, in the present embodiment, since the threshold value regarding the subcooling degree changes according to the state of the compressor 20, it is possible to further enhance the cooling and heating capacity and the cooling and heating efficiency of the air conditioning device for a vehicle.

In the present embodiment, the expansion valve control detector 30 composed of a set of detectors (one temperature sensor 31 and one pressure sensor 32) is provided between the second port 23*b* of the second expansion valve 23 and the connection position with the first heating dedicated line 46 in the inter-expansion valve line 44 to detect the state quantity of the refrigerant between them. Even in both the heating mode and the cooling mode, the liquid-phase refrigerant flows between the second port 23*b* of the second expansion valve 23 and the connection position with the first heating dedicated line 46 in the inter-expansion valve line 44, as shown in FIGS. 2 and 3. Therefore, it is possible to control the opening degree of the first expansion valve 22 in the cooling mode and the opening degree of the second expansion valve 23 in the heating mode according to the subcooling degree based on the state quantity of the refrigerant detected by the expansion valve control detector 30 composed of a set of detectors. Therefore, in the present embodiment, an increase in the number of detectors can be suppressed, and an increase in the size of the air conditioning device for a vehicle and an increase in manufacturing cost can be suppressed.

Modification Example

A vehicle has a plurality of heat sources such as an engine, a motor, and a battery. As drawn in parentheses in FIG. 1, an auxiliary heat exchanger 35 which heats the refrigerant in the discharge line 41 by utilizing the heat from these heat sources may be provided. The auxiliary heat exchanger 35 may be provided in the first discharge line 41*a*, may be provided in the second discharge line 41*b*, or may be provided over the first discharge line 41*a* and the second discharge line 41*b*. Further, the auxiliary heat exchanger 35 may be provided in the first heating dedicated line 46. The auxiliary heat exchanger 35 is provided in this manner, whereby the heating capacity can be enhanced. In the auxiliary heat exchanger 35, a medium for heat exchange with the refrigerant is not limited to a liquid such as water or a coolant, and may be a gas such as air.

In the above embodiment, the indoor condenser 14 is provided in the discharge line 41. However, similarly to the auxiliary heat exchanger 35 described above, the indoor condenser 14 may be provided in the first heating dedicated line 46.

The EV vehicle, the HEV vehicle, and the PHEV vehicle are equipped with a high-performance battery. The high-performance battery generally generates a large amount of heat and needs to be cooled. The EV vehicle, the HEV vehicle, and the PHEV vehicle are equipped with a battery cooler for cooling the high-performance battery. Therefore, in the battery cooler, as a medium for removing heat from the high-performance battery, a refrigerant flowing in the refrigerant line 40 of the air conditioning device for a vehicle may be used.

In this case, as drawn in parentheses in FIG. 1, a battery cooler 36 has an inlet 36a through which the refrigerant flows in and an outlet 36b through which the refrigerant flows out. The inlet 36a of the battery cooler 36 and the inter-expansion valve line 44 are connected by a cooler inlet line 48. The outlet 36b of the battery cooler 36 and the second suction line 45b are connected by a cooler outlet line 49. The cooler inlet line 48 and the cooler outlet line 49 configure a part of the refrigerant line 40. A third expansion valve 24 is provided in the cooler inlet line 48. The third expansion valve 24 has a valve case, a valve body disposed in the valve case, and an electromagnetic drive mechanism that moves the valve body in the valve case to change an opening degree, similar to the first expansion valve 22 and the second expansion valve 23. The valve case has a first port 24a and a second port 24b through which the refrigerant enters and exits.

In this manner, in a case where the battery cooler 36 is provided in the refrigerant line 40, the controller 50 executes a battery cooling mode. In the battery cooling mode, the controller 50 gives a command to the three-way valve 25 to enter the cooling state, and gives a closing command to the two-way valve 26. The controller 50 gives a closing command to the first expansion valve 22, gives an open command to the second expansion valve 23, and gives an opening degree command indicating the opening degree according to the state quantity of the refrigerant detected by the expansion valve control detector 30 to the third expansion valve 24. The controller 50 gives a drive command to the compressor 20. On the other hand, the controller 50 does not give a drive command to the blower 12 of the HVAC unit 10, unlike in the heating mode or the cooling mode. The controller 50 gives a damper opening degree command to cause most of the air which has flowed into the unit duct 11 to bypass the indoor condenser 14 without passing through it to the air mix damper 15 of the HVAC unit 10.

Figure 4:
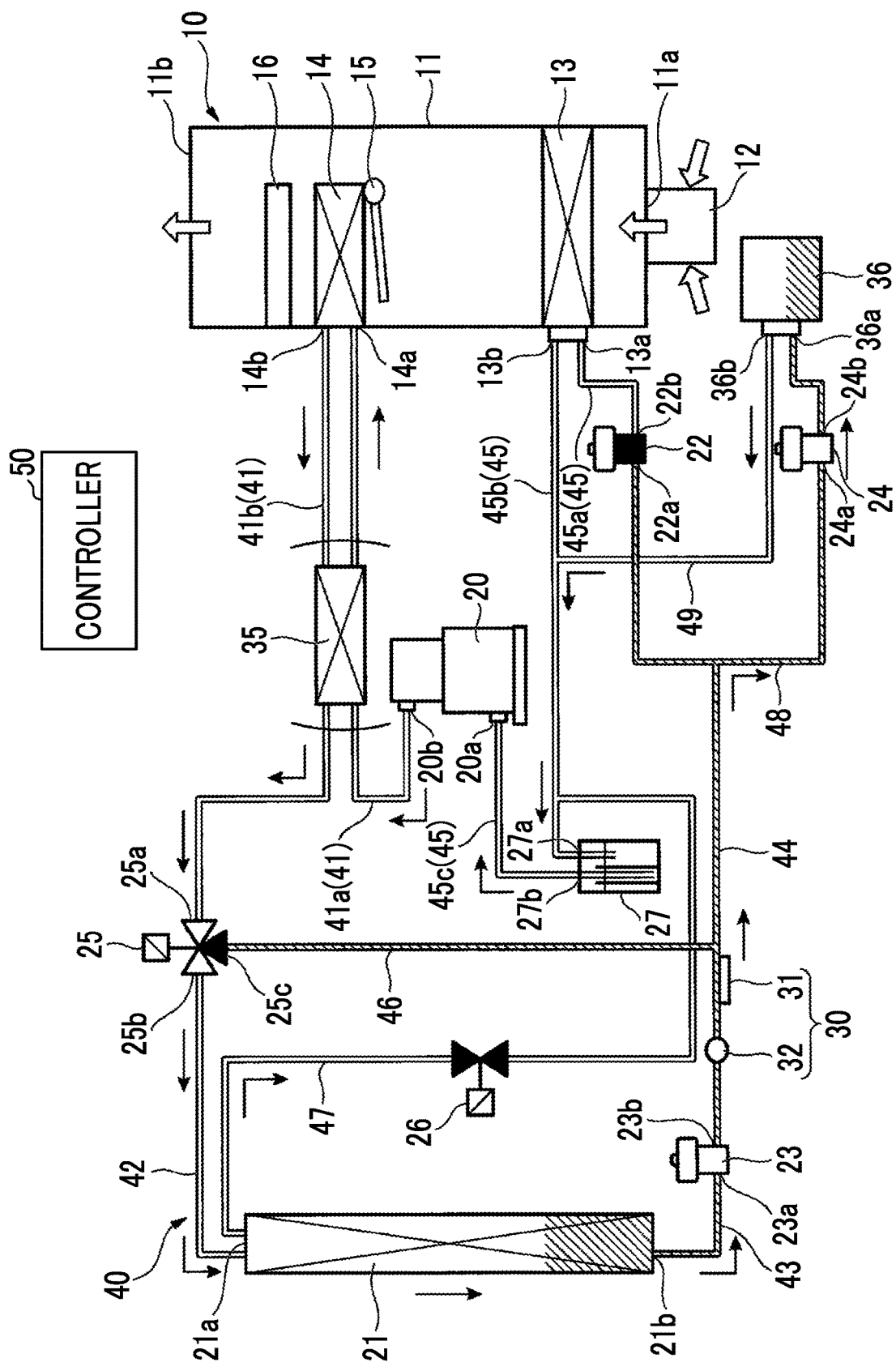
FIG. 4 is an explanatory diagram showing a flow of the refrigerant in a battery cooling mode of the air conditioning device for a vehicle according to an embodiment of the present invention.

As a result, as shown in FIG. 4, the three-way valve 25 enters the cooling state, and the inlet 25a and the first outlet 25b of the three-way valve 25 enter the communication state. The two-way valve 26 enters the closed state. The first expansion valve 22 is in the closed state and the second expansion valve 23 is in the open state. The opening degree of the air mix damper 15 becomes an opening degree in which most of the air which has flowed into the unit duct 11 bypass the indoor condenser 14 without passing through it. The compressor 20 begins to drive and rotate.

When the air conditioning device for a vehicle enters the above state, the gas-phase refrigerant compressed by the compressor 20 flows into the indoor condenser 14 via the first discharge line 41a. Since the blower 12 of the HVAC unit 10 is not driven and the air mix damper 15 of the HVAC unit 10 is present, air does not almost pass through the indoor condenser 14. Therefore, in the indoor condenser 14, the amount of heat exchange between the gas-phase refrigerant and the air is small, the refrigerant is not almost condensed, and the air is not almost heated. Accordingly, the gas-phase refrigerant that has flowed into the indoor condenser 14 flows out from the indoor condenser 14 as it is.

The gas-phase refrigerant flowing out from the indoor condenser 14 flows into the three-way valve 25 from the inlet 25a of the three-way valve 25 via the second discharge line 41b. In the three-way valve 25, in the cooling state, the inlet 25a and the first outlet 25b are in the communication state, and therefore, the gas-phase refrigerant which has flowed into the three-way valve 25 flows into the outdoor heat exchanger 21 from the first port 21a of the outdoor heat exchanger 21 via the heat exchanger first port line 42. In the outdoor heat exchanger 21, the heat exchange between the outside air and the gas-phase refrigerant is performed, so that the refrigerant is cooled and condensed and the outside air is heated. That is, in the battery cooling mode, the outdoor heat exchanger 21 functions as a condenser.

The condensed refrigerant, that is, the liquid-phase refrigerant flows out from the second port 21b of the outdoor heat exchanger 21. In FIG. 4, in the refrigerant line 40, the hatched portion is a portion where the liquid-phase refrigerant is present. The liquid-phase refrigerant flows into the third expansion valve 24 via the heat exchanger second port line 43, the second expansion valve 23 in the open state, a part of the inter-expansion valve line 44, and the cooler inlet line 48. The liquid-phase refrigerant is decompressed and expanded in the process of passing through the third expansion valve 24, and a part of the liquid-phase refrigerant becomes a gas phase. The refrigerant flows into the battery cooler 36 via the cooler inlet line 48.

In the battery cooler 36, the battery and the liquid-phase refrigerant perform direct or indirect heat exchange, so that the refrigerant is heated and evaporated and the battery is cooled. That is, the battery cooler 36 functions as an evaporator for the refrigerant.

The refrigerant evaporated in the battery cooler 36, that is, the gas-phase refrigerant flows into the compressor 20 from the battery cooler 36 via the cooler outlet line 49, a part of the second suction line 45b, the buffer tank 27, and the third suction line 45c.

The gas-phase refrigerant is compressed by the compressor 20 and then flows into the indoor condenser 14 via the first discharge line 41a, as described above.

The pressure of the liquid-phase refrigerant detected by the pressure sensor 32 is input to the controller 50, as in the heating mode and the cooling mode. The controller 50 obtains the saturation temperature of the refrigerant, based on this pressure. Further, the controller 50 obtains a subcooling degree which is a deviation between the saturation temperature and the temperature of the liquid-phase refrigerant detected by the temperature sensor 31. The controller 50 compares the subcooling degree with the threshold value, and in a case where the subcooling degree is larger than the threshold value, the controller 50 gives an opening degree command in a direction of making the opening degree larger than that at the present time to the third expansion valve 24. Further, in a case where the subcooling degree is smaller than the threshold value, the controller 50 gives an opening degree command in a direction of making the opening degree smaller than that at the present time to the third expansion valve 24.

Also in this modification example, as described above, in a case where the subcooling degree is smaller than the threshold value, the opening degree command in a direction of making the opening degree smaller than that at the present time is given to the third expansion valve 24. Therefore, in this modification example, it is possible to enhance the cooling capacity of the battery. Further, in this modification example, as described above, in a case where the subcooling degree is larger than the threshold value, the opening degree command in a direction of making the opening degree larger than that at the present time is given to the third expansion valve 24. Therefore, in this modification example, it is possible to improve the cooling efficiency of the battery.

Also in this modification example, a set of detectors is provided between the second port 23b of the second expansion valve 23 and the connection position with the first heating dedicated line 46 in the inter-expansion valve line 44 to detect the state quantity of the refrigerant between them. The liquid-phase refrigerant flows between the second port 23b of the second expansion valve 23 and the connection position with the first heating dedicated line 46 in the inter-expansion valve line 44 not only in the heating mode or cooling mode but also in the battery cooling mode. Therefore, it is possible to control not only the opening degree of the first expansion valve 22 in the cooling mode or the opening degree of the second expansion valve 23 in the heating mode but also the opening degree of the first expansion valve 22 in the battery cooling mode, according to the subcooling degree based on the state quantity of the refrigerant detected by the expansion valve control detector 30 composed of a set of detectors. Therefore, also in this modification example, an increase in the number of detectors can be suppressed, and an increase in the size of the air conditioning device for a vehicle and an increase in manufacturing cost can be suppressed.

In the present embodiment, the expansion valve control detector 30 is provided between the second port 23b of the second expansion valve 23 and the connection position with the first heating dedicated line 46 in the inter-expansion valve line 44. However, one detector or both the detectors of the temperature sensor 31 and the pressure sensor 32 constituting the expansion valve control detector 30 may be provided in the first heating dedicated line 46 (inter-expansion valve connection line) in which the liquid-phase refrigerant is present during heating and cooling. However, although the liquid-phase refrigerant is present in the first heating dedicated line 46 during the heating and the cooling, the liquid-phase refrigerant merely stays during the cooling and does not flow. Therefore, from the viewpoint of accurately detecting the temperature of the liquid-phase refrigerant, it is preferable that at least the temperature sensor 31 of the temperature sensor 31 and the pressure sensor 32 constituting the expansion valve control detector 30 is provided between the second port 23b of the second expansion valve 23 and the connection position with the first heating dedicated line 46 in the inter-expansion valve line 44.

INDUSTRIAL APPLICABILITY

According to an aspect of the present invention, it is possible to suppress an increase in the size of the device and an increase in manufacturing cost while enhancing the cooling and heating capacity or the cooling and heating efficiency.

REFERENCE SIGNS LIST

10: HVAC unit
11: unit duct
11a: air inlet
11b: air outlet
12: blower
13: indoor evaporator
13a: inlet
13b: outlet
14: indoor condenser
14a: inlet
14b: outlet
15: air mix damper
16: auxiliary heater
20: compressor
20a: suction port
20b: discharge port
21: outdoor heat exchanger
21a: first port
21b: second port
22: first expansion valve
22a: first port
22b: second port
23: second expansion valve
23a: first port
23b: second port
24: third expansion valve
24a: first port
24b: second port
25: three-way valve
25a: inlet
25b: first outlet
25c: second outlet
26: two-way valve
27: buffer tank
27a: inlet
27b: outlet
30: expansion valve control detector
31: temperature sensor
32: pressure sensor
35: auxiliary heat exchanger
36: battery cooler
36a: inlet
36b: outlet
40: refrigerant line
41: discharge line
41a: first discharge line
41b: second discharge line
42: heat exchanger first port line
43: heat exchanger second port line
44: inter-expansion valve line
45: suction line
45a: first suction line
45b: second suction line
45c: third suction line
46: first heating dedicated line
47: second heating dedicated line
48: cooler inlet line
49: cooler outlet line
50: controller

The invention claimed is:

1. An air conditioning device for a vehicle comprising:
a compressor that compresses a refrigerant;
an indoor condenser that performs heat exchange between the refrigerant and indoor air to cool and condense the refrigerant and heat the indoor air;
an indoor evaporator that performs heat exchange between the refrigerant and the indoor air to heat and evaporate the refrigerant and cool the indoor air;
an outdoor heat exchanger that has a first port and a second port through which the refrigerant enters and exits and that performs heat exchange between the refrigerant and outside air to function as a condenser that cools and condenses the refrigerant during cooling and function as an evaporator that heats and evaporates the refrigerant during heating;
a first expansion valve that has a first port and a second port through which the refrigerant enters and exits and that expands the refrigerant in a liquid phase and sends the refrigerant to the indoor evaporator, during cooling;
a second expansion valve that has a first port and a second port through which the refrigerant enters and exits and that during heating expands the refrigerant in a liquid phase and sends the refrigerant to the outdoor heat exchanger;
a refrigerant line that interconnects the compressor, the indoor condenser, the indoor evaporator, the outdoor heat exchanger, the first expansion valve, and the second expansion valve;
an expansion valve control detector that detects a state quantity of the refrigerant;
a controller; and
a three-way valve that has an inlet through which the refrigerant flows in, and a first outlet and a second outlet through which the refrigerant flows out, and changes to a cooling state where the inlet and the first outlet communicate with each other, and a heating state where the inlet and the second outlet communicate with each other,
wherein the refrigerant line has
an inter-expansion valve line which connects the first expansion valve and the second expansion valve, and in which the refrigerant in a liquid phase is present during heating and cooling,
an inter-expansion valve connection line which is connected to the inter-expansion valve line without intervention of equipment including a valve, and in which the refrigerant in a liquid phase is present during heating and cooling,
a discharge line connecting a discharge port of the compressor and the inlet of the three-way valve,
a heat exchanger first port line connecting the first outlet of the three-way valve and the first port of the outdoor heat exchanger,
a heat exchanger second port line connecting the second port of the outdoor heat exchanger and the first port of the second expansion valve,
the inter-expansion valve line connecting the second port of the second expansion valve and the first port of the first expansion valve,
a suction line connecting the second port of the first expansion valve and a suction port of the compressor,
a first heating dedicated line connecting the second outlet of the three-way valve and the inter-expansion valve line, and
a second heating dedicated line connecting the first port of the outdoor heat exchanger and the suction line,
the first heating dedicated line constitutes at least a part of the inter-expansion valve connection line,
the inter-expansion valve line is configured such that the refrigerant in a liquid phase flows between the second port of the second expansion valve and a connection position with the first heating dedicated line during heating and cooling,
the expansion valve control detector includes only one temperature sensor provided in the inter-expansion valve line or the inter-expansion valve connection line to detect a temperature of the refrigerant in the inter-expansion valve line or the inter-expansion valve connection line, and only one pressure sensor provided in the inter-expansion valve line or the inter-expansion valve connection line to detect a pressure of the refrigerant in the inter-expansion valve line or the inter-expansion valve connection line, and
the controller gives, during cooling, an opening degree command indicating an opening degree according to the state quantity of the refrigerant detected by the expansion valve control detector to the first expansion valve, and gives, during heating, an opening degree command indicating an opening degree according to the state quantity of the refrigerant detected by the expansion valve control detector to the second expansion valve.

2. The air conditioning device for a vehicle according to claim 1, further comprising a two-way valve,
wherein the indoor condenser is provided in the discharge line or the first heating dedicated line,
the indoor evaporator is provided in the suction line,
the two-way valve is provided in the second heating dedicated line, and
when the three-way valve is in the cooling state, the controller gives a closing command to the two-way valve, gives an open command to the second expansion valve, and gives an opening degree command indicating an opening degree according to the state quantity of the refrigerant detected by the expansion valve control detector to the first expansion valve, and when the three-way valve is in the heating state, the controller gives an open command to the two-way valve, gives a closing command to the first expansion valve, and gives an opening degree command indicating an opening degree according to the state quantity of the refrigerant detected by the expansion valve control detector to the second expansion valve.

3. The air conditioning device for a vehicle according to claim 1, wherein the expansion valve control detector is provided between the second port of the second expansion valve and a connection position with the first heating dedicated line in the inter-expansion valve line, and detects a state quantity of the refrigerant between the second port of the second expansion valve and the connection position with the first heating dedicated line in the inter-expansion valve line.

4. The air conditioning device for a vehicle according to claim 1, wherein the controller gives an opening degree command indicating an opening degree according to a subcooling degree, which is a deviation between a saturation temperature of the refrigerant, which is determined by a pressure detected by the pressure sensor, and a temperature of the refrigerant detected by the temperature sensor, to the first expansion valve and the second expansion valve.

5. The air conditioning device for a vehicle according to claim 4, wherein the controller gives an opening degree command in a direction of making an opening degree larger than that at the present time, in a case where the subcooling degree is larger than a threshold value regarding the subcooling degree, and gives an opening degree command in a direction of making an opening degree smaller than that at the present time, in a case where the subcooling degree is smaller than the threshold value.

6. The air conditioning device for a vehicle according to claim 5, wherein the threshold value is in a range of 5° C. to 20° C.

7. The air conditioning device for a vehicle according to claim 5, wherein the controller changes the threshold value according to a rotation speed of the compressor.

8. The air conditioning device for a vehicle according to claim 7, wherein the controller uses a first threshold value as the threshold value when the rotation speed of the compressor is a first rotation speed, and uses a second threshold value larger than the first threshold value as the threshold value when the rotation speed of the compressor is a second rotation speed higher than the first rotation speed.

* * * * *